United States Patent
DiMascio, II et al.

(10) Patent No.: US 8,211,502 B2
(45) Date of Patent: Jul. 3, 2012

(54) ARAMID CORD TREATMENT

(75) Inventors: Ramon Joseph DiMascio, II, Cuyahoga Falls, OH (US); Robert Charles Schisler, Munroe Falls, OH (US)

(73) Assignee: Veyance Technologies, Inc., Fairlawn, OH (US)

(*) Notice: Subject to any disclaimer, the term of this patent is extended or adjusted under 35 U.S.C. 154(b) by 1087 days.

(21) Appl. No.: 11/148,839

(22) Filed: Jun. 9, 2005

(65) Prior Publication Data

US 2006/0147711 A1 Jul. 6, 2006

Related U.S. Application Data

(60) Provisional application No. 60/640,816, filed on Dec. 30, 2004.

(51) Int. Cl.
 *B05D 3/02* (2006.01)
(52) U.S. Cl. ......................................................... 427/316
(58) Field of Classification Search .................. 427/316
 See application file for complete search history.

(56) References Cited

U.S. PATENT DOCUMENTS

| | | | |
|---|---|---|---|
| 3,138,962 A | 6/1964 | Haines, Jr. et al. | |
| 3,313,166 A | 4/1967 | Elster | |
| 3,349,634 A | 10/1967 | Terhune et al. | |
| 3,894,900 A | 7/1975 | Redmond, Jr. | |
| 4,282,793 A | 8/1981 | Muchnick | |
| 4,389,504 A * | 6/1983 | St. Clair et al. | 524/233 |
| 4,596,582 A * | 6/1986 | Logullo, Sr. | 8/115.6 |
| 4,612,209 A | 9/1986 | Forgo et al. | 427/516 |
| 4,838,843 A | 6/1989 | Westhoff | |
| 4,948,449 A * | 8/1990 | Tarbutton et al. | 156/307.3 |
| 5,209,705 A | 5/1993 | Gregg | |
| 5,291,930 A * | 3/1994 | Kikuchi et al. | 152/451 |
| 5,470,517 A * | 11/1995 | Conley | 264/137 |
| 5,521,007 A | 5/1996 | Kurokawa | |
| 5,807,194 A | 9/1998 | Knutson et al. | |
| 5,891,561 A | 4/1999 | Kinoshita et al. | |
| 5,977,490 A | 11/1999 | Kawakita et al. | |
| 6,063,839 A * | 5/2000 | Oosedo et al. | 523/206 |
| 6,211,280 B1 * | 4/2001 | Schell | 524/494 |
| 6,287,696 B1 * | 9/2001 | Noda et al. | 428/411.1 |
| 6,376,564 B1 * | 4/2002 | Harrison | 521/54 |
| 6,453,960 B1 | 9/2002 | Kondo et al. | |
| 2003/0198794 A1 | 10/2003 | Fukuyama | |
| 2004/0039133 A1 * | 2/2004 | Scherzer et al. | 525/403 |
| 2004/0050580 A1 * | 3/2004 | Hager et al. | 174/116 |
| 2004/0115413 A1 | 6/2004 | Lofgren | |
| 2004/0127616 A1 * | 7/2004 | Wentworth et al. | 524/284 |

FOREIGN PATENT DOCUMENTS

| | | |
|---|---|---|
| EP | 0378232 A1 | 7/1990 |
| EP | 0688973 A1 | 12/1995 |
| EP | 1442900 A2 | 4/2004 |
| JP | 02150345 | 6/1990 |
| JP | 03221537 | 9/1991 |

OTHER PUBLICATIONS

Dow Liquid Epoxy Resins, Form# 296-00224-0199 WC+M, published Jan. 1999, p. 1-43.*
European Patent Office, Extended European Search Report in Corresponding DN2004-024-EPC, Mar. 22, 2006.
Chinese Patent Office, Chinese Office Action in CN Application No. 200510137589.0, Jan. 18, 2008, 15 pgs.
Chinese Patent Office, Chinese Office Action in counterpart Chinese Application No. 200510137589.0, Aug. 29, 2008, 10 pages.

* cited by examiner

*Primary Examiner* — Nathan Empie
(74) *Attorney, Agent, or Firm* — Alvin T. Rockhill; Kathleen K. Bowen

(57) ABSTRACT

A composition and method for treating an aramid cord include a bisphenol-A-based- and/or a bisphenol-F-based-liquid epoxy resin, a reactive diluent, and a curing agent. The composition and method also may include an elastomer-modified epoxy-functional adduct and/or an elastomer-modified epoxy-resin adduct.

9 Claims, No Drawings

ARAMID CORD TREATMENT

CROSS-REFERENCE TO RELATED APPLICATION

This patent document claims the benefit of the filing date of Provisional U.S. Patent Application No. 60/640,816 entitled "Aramid Cord Treatment" and filed on Dec. 30, 2004. The entire disclosure of Provisional U.S. Patent Application No. 60/640,816 is incorporated into this patent document by reference.

BACKGROUND OF THE INVENTION

1. Field of the Invention

This invention relates to the treatment of textile cords for use as tensile reinforcements in elastomeric products, and more particularly, to the treatment of aramid cords for such uses.

2. Description of Related Art

Textile cord has long been used as a tensile reinforcement material for reinforcing various elastomeric products, for example, power transmission belts, conveyor belts, hoses, tires, and the like. In order to serve as a reinforcement, the textile cord typically is embedded in the particular elastomeric material. And, depending on the particular end use of the reinforced elastomer, oftentimes the cord is treated prior to being embedded in the elastomer in order to enhance any of a number of desired properties, for example, cord-to-elastomer adhesion, inhibition of textile-filament degradation, and flexibility.

Various treatments have been proposed for treating aramid cord that is to be used in reinforcing an elastomeric product (i.e., a rubber product). Specifically, one treatment proposes treating the cord with a resorcinol-formalin-rubber latex adhesive ("RFL") liquid. While the bending performance of cords treated with RFL solutions is good, there is a tendency for cut edges to fray during manufacturing and belt operation. In addition, moisture uptake can be a problem due to incomplete impregnation of the cord due to the evaporation of the water carrier which can lead to voids and untreated areas of cord. Moisture uptake has the potential to lead to dimensional instability in certain types of fibers like aramid. Another approach calls for pretreating the cord with an isocyanate solution or an aqueous based epoxy solution, and then treating the pretreated cord with an RFL liquid. While this methodology tends to improve a cord's resistance to fray, it results in an undesirable reduction in bending fatigue resistance. Epoxy solutions and isocyanate solutions may also lead to unwanted moisture uptake after treatment.

SUMMARY OF THE INVENTION

The present invention addresses the limitations and drawbacks described above by employing select combinations of component materials that are 100% reactive. The treatment compositions and methods of the invention result in improved cord penetration and treatment uniformity, including fewer treatment voids. The compositions and methods also result in treated aramid cord that has improved dimensional stability, moisture retardation, fray resistance, and cuttability. This is accomplished by providing a treatment composition and method that include a bisphenol-A-based- and/or bisphenol-F-based-liquid epoxy resin, a reactive diluent, and a curing agent. The composition and method also may include an elastomer-modified epoxy-functional adduct and/or an elastomer-modified epoxy-resin adduct.

DETAILED DESCRIPTION OF EMBODIMENTS OF THE INVENTION

As used herein, the term "phr" means parts by weight per hundred parts by weight of resin. The term "resin", as used in the definition of phr above, means the liquid epoxy resin and, if used, the reactive diluent, the elastomer-modified epoxy-functional adduct, and the elastomer-modified epoxy-resin adduct. In addition, as used herein, the terms "aramid fiber cord" and "aramid cord" refer to cord in which at least one of the fibers, or threads, is an aramid (i.e., a highly aromatic polyamide).

The treatment composition of the invention may include a bisphenol-A-based- and/or a bisphenol-F-based-liquid epoxy resin, a reactive diluent, and a curing agent. If desired, the treatment composition also may include an elastomer-modified epoxy-functional adduct and/or an elastomer modified epoxy-resin adduct.

The liquid epoxy resin may be one or more bisphenol-A-based liquid epoxy resins, one or more bisphenol-F-based liquid epoxy resins, or combinations thereof. Examples of a bisphenol-A/epichlorohydrin-derived liquid epoxy resin include EPON™ Resin 828 from Resolution Performance Products LLC of Houston, Tex., and D.E.R. 331 from The Dow Chemical Company of Midland, Mich. An example of a bisphenol-F/epichlorohydrin-derived epoxy resin is EPON™ Resin 863 from Resolution Performance Products LLC. If desired, the liquid epoxy resin or resins may be present in an amount of from about 40 to about 90 phr, advantageously from about 60 to about 80 phr.

The curing-agent component for use in forming the cord-treatment composition may include one or more polyamides, polyamines, and/or amidoamines. Examples of such polyamides include Ancamide® 910 from Air Products and Chemicals, Inc. of Allentown, Pa. and EPI-CURE™ Curing Agent 3140 from Resolution Performance Products LLC. An example of a suitable polyamine is EPI-CURE™ Curing Agent 3164 from Resolution Performance Products LLC. And examples of such amidoamines include EPI-CURE™ Curing Agent 3010, 3055, and 3061, all from Resolution Performance Products LLC, and Ancamide™ 2447 from Air Products and Chemicals, Inc. If desired, the curing agent or agents may be present in an amount of from about 0.6 to about 1.5 times the stoichiometric quantity, as determined using the amine-H-equivalent-weight (AHEW)/epoxide equivalent weight (EEW) method, advantageously from about 0.7 to about 1 times the stoichiometric quantity. The AHEW/EEW method is described: (1) in an Air Products document entitled *Calculating Stoichiometry Ratios for Epoxy Curing Agents and Resins*, further identified by the notice "©Air Products and Chemicals, Inc., 2003 (23202)"; and (2) on page 7 of a Dow Chemical document entitled *Dow Liquid Epoxy Resins* published January 1999 (Form No. 296-00224-0199 WC+M). Both of these documents are incorporated into this patent document by reference.

In embodiments of the invention that include a reactive diluent, the reactive diluent may be one or more glycidyl ethers, one or more glycidyl esters, or a combination thereof. Examples of such ethers include butyl glycidyl ether, cresyl glycidyl ether, 2-ethylhexyl glycidyl ether, a polyglycidyl ether of an aliphatic polyol, and a polyglycidyl ether of acstor oil. An example of a glycidyl ester is a glycidyl ester of a synthetic saturated monocarboxylic acid. Examples of specific glycidyl ethers include HELOXY™ Modifier 8 and Modifier 116 from Resolution Performance Products LLC, as well as Epodile® 746 and 748 from Air Products and Chemicals, Inc. An example of a particular glycidyl ester is CARDURA™ Resin E-10P from Resolution Performance Products LLC. If desired, the reactive diluent or diluents may be present in an amount from about 0 to about 40 phr, advantageously from about 10 to about 30 phr.

If desired, a composition or compositions of one or more liquid epoxy resins that already have been combined with one or more reactive diluents may be used—either in place of, or in addition to, one or more separate liquid epoxy resins and reactive diluents. Examples of such diluent-modified liquid epoxy resins include EPON™ Resin 8132 (a bisphenol-A-based epoxy resin diluted with an alkyl glycidyl ether) from Resolution Performance Products LLC, D.E.R. 324 (a $C_{12}$-$C_{14}$ aliphatic-chain-glycidyl-ether-modified bisphenol-A-based liquid epoxy resin) from The Dow Chemical Company, and D.E.R. 353 (a $C_{12}$-$C_{14}$ aliphatic-chain-glycidyl-ether-modified bisphenol-A/F-based liquid epoxy resin) also from The Dow Chemical Company.

If desired, one or more elastomer-modified epoxy-functional adducts and/or elastomer-modified epoxy-resin adducts also may be used to form the cord-treatment composition. Examples of elastomer-modified epoxy-functional adducts include a reaction product of a diglycidyl ether of neopentyl alcohol and a carboxyl-terminated butadiene-acrylonitrile elastomer (e.g., EPON™ Resin 58034 from Resolution Performance Products LLC), a reaction product of a diglycidyl ether of bisphenol-A and a carboxyl-terminated butadiene-acrylonitrile elastomer (e.g., EPON™ Resin 58006 from Resolution Performance Products LLC), a carboxyl-terminated butadiene-acrylonitrile elastomer (e.g., CTBN-1300X8 and CTBN-1300X13 from Noveon, Inc. of Cleveland, Ohio), and an amine-terminated butadiene-acrylonitrile elastomer (e.g., ATBN-1300X16 and ATBN-1300X42 from Noveon, Inc.). An example of the elastomer-modified epoxy-resin adduct is an adduct of a bisphenol-F-based epoxy resin and a carboxyl-terminated butadiene-acrylonitrile elastomer (e.g., EPON™ Resin 58003 from Resolution Performance Products LLC). If desired, the adduct or adducts may be present in an amount of from about 0 to about 30 phr, advantageously from about 10 to about 25 phr.

The treatment compositions may be made using any suitable method(s) and equipment. For example, the components of the treatment composition may be mixed in an appropriately-sized steel tank, bucket, or drum at room temperature. In addition, the component materials may be added in any order. For example, if a liquid epoxy resin, a reactive diluent, an elastomer-modified adduct, and a curing agent are used, the resin and diluent may be mixed together, followed by the addition and mixing of the adduct, followed by the addition and mixing of the curing agent.

Advantageously, the aramid cord is heated before being treated with the particular treatment composition. Any suitable heating method and apparatus may be used, for example, a drying chamber or an oven. The cord may be heated at a temperature of from about 110 to about 120° C. for a period of about 12 to about 24 hours.

The heated cord then may be treated with the composition using any suitable method(s) and equipment. For example, the cord may be treated using a conventional large-scale dip-unit assembly or a conventional pultrusion assembly. Then, if needed, any excess treatment composition may be removed from the cord using any conventional technique. For example, excess composition may be wiped off of the treated cord. Or the treated cord may be pulled through an orifice, with the orifice size advantageously determined based on the cord dimensions and the desired epoxy retention level. The cord then may be dried in a suitable oven or drying chamber at a temperature of from about 100 to about 150° C. for a period of from about 10 to about 30 minutes.

Any suitable product or products then may be made using the treated aramid cord, according to the particular manufacturing technique(s) for each such product, as is known to those of ordinary skill in the art. Examples of rubber-based products that may include the treated aramid cord are power transmission belt components, power transmission belts, tire components, tires, hose components, hoses, conveyor belt components, conveyor belts, and rubber containers.

EXAMPLE

Lengths of Kevlar® aramid cord were treated and tested as described below.

Control samples (designated by the Letter "A" in Tables I and II) were prepared by treating lengths of Kevlar® cord using the ingredients and amounts listed in Table I, under the Sample A heading. The treatment included two main steps, as follows. In the first treatment step, lengths of Kevlar® cord were treated with an aqueous dispersion containing about 5% by weight of polyamide and about 1% epoxy, as indicated in Table I. In the second treatment step, the lengths of polyamide/epoxy treated cord were further treated with an RFL liquid.

Other test samples (designated by the letters "B" through "H" in Tables I and II) were prepared by treating lengths of Kevlar® cord with one of the treatment compositions identified under the B through H headings in Table I. Each of the treatment compositions was prepared by weighing out, combining, and mixing the particular ingredients in a 200 ml lab beaker at room temperature. Prior to contact with a particular treatment composition, the corresponding lengths of aramid cord were heated at a temperature of about 107° C. for about 24 hours. The heated lengths of aramid cord then were hand-dipped into the particular treatment composition, pulled through a rubber orifice having a 2 mm diameter, and hand-wiped with a clean paper napkin to remove excess composition. The treated lengths of cord then were heated in a drying oven at about 150° C. for about 8 minutes, thereby curing the treatment composition.

A few of the treated cords resulting from each of the eight (A through H) different treatments then were partially embedded, each in their own respective block of hydrogenated nitrile rubber ("HNBR"). Each block subsequently was cured at about 170° C. for about 20 minutes, in preparation for performing the adhesion, interaction, and flexibility tests identified in Table II.

With reference to Table II, the adhesion test was performed using an H-block method, substantially as described in ASTM D 4776-98. The epoxy/HNBR interaction test was performed by visually inspecting the treated cord once it had been pulled out of the H-block. The test results represent a visual observation of rubber coverage on the cord surface. The numeral 1 represents about 0% rubber coverage, 2 represents about 50% rubber coverage, and 3 represents more than about 90% rubber coverage on the cord surface. Treated cord flexibility was measured by visual observation. Specifically, each treated cord was bent around a cylindrical fixture having a diameter of about one inch, and a visual observation was made of the amount of cracking, if any, of the treatment composition on the cord. For this particular test, the numeral 1 indicates that a sample showed no visual cracking and was highly flexible, 2 represents some visual cracking and a moderate degree of flexibility, and 3 represents a high level of cracking and relative inflexibility or stiffness.

All of the other tests performed and presented in Table II (max load, breaking strength, load at specified elongation ("LASE"), energy to break point, toughness, and modulus) were performed substantially in accordance with ASTM D 2256-97.

With reference to Table II, the lengths of Kevlar® aramid cord treated in accordance with the invention (resulting in Sample B-H treated cords) produced results generally comparable with those of the lengths of Kevlar® cord that received the control treatment (resulting in Sample A treated cords).

While the present invention has been illustrated by the description of embodiments, and while the illustrative embodiments have been described in considerable detail, it is not the intention of the inventors to restrict or in any way limit the scope of the appended claims to such detail. Additional advantages and modifications readily will appear to those skilled in the art. The invention in its broader aspects is therefore not limited to the specific details, representative apparatus and methods, and illustrative examples shown and described. Accordingly, departures may be made from such details without departing from the spirit or scope of the inventor's general inventive concept.

TABLE I

| | Samples | | | | | | | |
|---|---|---|---|---|---|---|---|---|
| Description | A (Control) | B | C | D | E | F | G | H |
| Water | 100 | | | | | | | |
| Epoxy resin[1] | 2.5 | | | | | | | |
| Polyamide terpolymer (10 wt %), aq. dispersion[2] | 110 | | | | | | | |
| NaOH (30%) | 0.1 | | | | | | | |
| $C_{12}$-$C_{14}$ aliphatic chain glycidyl-ether-modified bisphenol-A-based liquid epoxy resin[3] | | 80 | 80 | 80 | | 80 | 80 | |
| $C_{12}$-$C_{14}$ aliphatic chain glycidyl-ether-modified bisphenol-A/F-based liquid epoxy resin[4] | | 0 | 0 | | 80 | | 0 | |
| Bisphenol-A/epichlorohydrin-derived liquid epoxy resin[5] | | 0 | 0 | | | | 0 | 66.4 |
| 2-ethylhexyl glycidyl-ether[6] | | 20 | 0 | 20 | 20 | | 5 | |
| Alkyl $C_{12}$-$C_{14}$ glycidyl-ether[7] | | 0 | 0 | | | | 0 | 33.6 |
| Adduct formed from reaction of diglycidyl ether of neopentyl glycol and CTBN rubber[8] | | 0 | 20 | | | 20 | 15 | |
| ATBN reactive liquid copolymer[9] | | | | | | | | 25 |
| Aliphatic amidoamine[10] | | 0 | 25.1 | 19.5 | 19.93 | 18.55 | 0 | |
| Oligomeric polyamine[11] | | 126.5 | 16.4 | | | | 122 | 115 |
| Polyamide[12] | | 0 | 0 | 29 | 29.95 | 27.83 | 0 | |

[1]Denecol EX313 from Nagase Chemicals Ltd.
[2]Genton 310 from General Plastics Corporation
[3]D.E.R. 324 from The Dow Chemical Company
[4]D.E.R. 353 from The Dow Chemical Company
[5]EPON ™ Resin 828 from Resolution Performance Products LLC
[6]HELOXY ™ Modifier 116 from Resolution Performance Products LLC
[7]HELOXY ™ Modifier 8 from Resolution Performance Products LLC
[8]EPON ™ Resin No. 58034 from Resolution Performance Products LLC
[9]Hycar ® ATBN 1300X16 from Noveon, Inc.
[10]EPI-CURE ™ Curing Agent No. 3061 from Resolution Performance Products LLC
[11]EPI-CURE ™ Curing Agent No. 3164 from Resolution Performance Products LLC
[12]Ancamide ® 910 from Air Products and Chemicals, Inc.

TABLE II

| | Samples | | | | | | | |
|---|---|---|---|---|---|---|---|---|
| Description | A (Control) | B | C | D | E | F | G | H |
| Adhesion, mean | 713 | 352 | 635 | 793 | 650 | 674 | 391 | 240 |
| Epoxy/HNBR Interaction | 3 | 1 | 3 | 2 | 2 | 2 | 1 | 1 |
| Flexibility | 1 | 1.25 | 1.5 | 3 | 2 | 2 | 1.25 | 1.25 |
| Max. Load (N) | 5,235 | 5,645 | 4,817 | 5,514 | 5,757 | 5,514 | 5,875 | 5,812 |
| Breaking Strength (N) | 5,235 | 4,793 | 4,164 | 5,514 | 5,757 | 5,348 | 5,875 | 4,369 |
| LASE @ 1% (N) | 309 | 786 | 224 | 297 | 417 | 506 | 824 | 739 |
| LASE @ 3% (N) | 2,508 | 3,686 | 2,251 | 2,466 | 3,255 | 3,361 | 3,536 | 3,446 |
| LASE @ 5% (N) | | | | 3,666 | | | | 1,248 |
| Energy to Break Pt (J) | 27 | 28 | 26 | 35 | 28 | 26 | 31 | 32 |
| Toughness (Mpa) | 27 | 26 | 16 | 36 | 22 | 20 | 28 | 32 |
| Modulus @ .05 & .1 of BRK (Mpa) | 19,972 | 24,123 | 12,598 | 23,350 | 20,347 | 19,066 | 23,876 | 25,853 |

What is claimed is:

1. A method of treating a flexible aramid fiber cord, consisting of the sequential steps of: (1) heating the flexible aramid fiber cord, (2) dipping the aramid fiber cord into a liquid composition consisting of: (i) a liquid epoxy resin selected from the group consisting of a bisphenol-A-based liquid epoxy resin, a bisphenol-F-based liquid epoxy resin and combinations thereof; (ii) 2-ethylhexyl glycidyl ether; and (iii) at least one curing agent, (3) removing any excess liquid composition from the flexible treated cord, and (4) drying the flexible treated aramid fiber cord, wherein the treated aramid fiber cord is flexible enough to be used as a reinforcement in rubber-based products including power transmission belts, hoses, and conveyor belts.

2. The method as specified in claim 1 wherein the treated aramid fiber cord is dried in step (4) at a temperature which is within the range of about 100° C. to about 150° C. for a period of about 10 minutes to about 30 minutes.

3. The method as specified in claim 2 wherein excess liquid composition is wiped off of the treated cord in step (3).

4. The method as specified in claim 1 wherein the liquid epoxy resin is a bisphenol-F-based liquid epoxy resin.

5. The method as specified in claim 1 wherein the curing agent is a polyamide.

6. The method as specified in claim 1 wherein the curing agent is present in an amount of from about 0.6 to about 1.5 times the stoichiometric quantity, as determined using the amine-H-equivalent-weight/epoxide equivalent weight method.

7. The method as specified in claim 1 wherein the excess liquid composition is removed from the flexible treated cord is step (3) by passing the flexible treated cord through an orifice.

8. The method as specified in claim 1 wherein the flexible aramid fiber cord is heated in step (1) to a temperature which is within the range of about 110° C. to about 120° C. for a period of about 12 hours to about 24 hours.

9. The method as specified in claim 1 wherein the flexible treated aramid fiber cord is dried in step (4) at a temperature which is within the range of about 100° C. to about 150° C. for a period of about 10 minutes to about 30 minutes.

* * * * *